(12) United States Patent
Crew

(10) Patent No.: US 7,581,890 B2
(45) Date of Patent: *Sep. 1, 2009

(54) METHOD, APPARATUS, AND SYSTEM FOR USING AN OPTICAL LINK WITH ELECTRICAL LINK RECEIVER DETECTION

(75) Inventor: Darren S. Crew, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/973,587

(22) Filed: Oct. 9, 2007

(65) Prior Publication Data

US 2008/0037994 A1    Feb. 14, 2008

Related U.S. Application Data

(63) Continuation of application No. 11/157,328, filed on Jun. 20, 2005, now Pat. No. 7,296,936.

(51) Int. Cl.
G02B 6/36 (2006.01)
(52) U.S. Cl. .................... 385/88; 398/135; 398/151
(58) Field of Classification Search .............. 385/88; 398/135, 151
See application file for complete search history.

(56) References Cited

U.S. PATENT DOCUMENTS

| | | | | |
|---|---|---|---|---|
| 5,510,917 | A * | 4/1996 | Corke et al. | 398/34 |
| 5,760,936 | A * | 6/1998 | Shirai | 398/48 |
| 6,009,488 | A | 12/1999 | Kavipurapu | 710/105 |
| 6,377,373 | B1 * | 4/2002 | Kawazawa et al. | 398/82 |
| 6,874,042 | B2 * | 3/2005 | Sauber | 710/38 |
| 7,336,902 | B1 * | 2/2008 | Gerszberg et al. | 398/115 |
| 2003/0043752 | A1 * | 3/2003 | Totsuka et al. | 370/249 |
| 2003/0063847 | A1 * | 4/2003 | BuAbbud | 385/24 |
| 2004/0103333 | A1 * | 5/2004 | Martwick et al. | 713/400 |
| 2005/0105861 | A1 * | 5/2005 | Vafiades et al. | 385/92 |
| 2005/0201749 | A1 * | 9/2005 | Wang et al. | 398/12 |
| 2005/0249499 | A1 * | 11/2005 | Krimmel et al. | 398/59 |
| 2006/0067064 | A1 | 3/2006 | Crews et al. | |
| 2006/0171717 | A1 * | 8/2006 | Kikuchi | 398/83 |
| 2006/0294272 | A1 * | 12/2006 | Chou et al. | 710/62 |

OTHER PUBLICATIONS

Guenter, J., et al., "Modulating VCSELs, Issue 2.0," Advanced Optical Components, pp. 1-17, Feb. 1998.

Maxim Integrated Products Application Note HFAN-2.0, Rev. 0; 5/00, "Interfacing Maxim Laser Drivers with Laser Diodes," pp. 1-12, 2000.

Maxim/Dallas Semiconductor Application Note 1769, "Behind the Lights Show in Optical Transceivers," pp. 1-5, Oct. 21, 2002.

PCI Express Base Specification Revision 1.0a, "Chapter 4: Physical Layer Specification," pp. 108, 151-220, Apr. 15, 2003.

Maxim Integrated Products Application Note HFDN-256.3, Rev. 0; 01/04, "MAX3735X Laser Drive Output Configurations, Part 4: Driving VCSELs," pp. 1-8, 2004.

* cited by examiner

*Primary Examiner*—Ellen Kim
(74) *Attorney, Agent, or Firm*—Trop, Pruner & Hu, P.C.

(57) ABSTRACT

A method, apparatus, and system for implementing optical interconnects between high speed electrical interconnects by determining if an optical link exists between two optical transceivers, and if so, connecting input termination on the transmit input portion of each optical transceiver.

13 Claims, 3 Drawing Sheets

METHOD, APPARATUS, AND SYSTEM FOR USING AN OPTICAL LINK WITH ELECTRICAL LINK RECEIVER DETECTION

This application is a continuation of U.S. patent application Ser. No. 11/157,328 filed Jun. 20, 2005 now U.S. Pat. No. 7,296,936 entitled "A METHOD, APPARATUS, AND SYSTEM FOR USING AN OPTICAL LINK WITH ELECTRICAL LINK RECEIVER DETECTION" the content of which is hereby incorporated by reference.

BACKGROUND

The present invention relates to optical interconnects and more specifically to implementing optical interconnects between high speed electrical interconnects having a receiver detection circuit, such as, but not limited to, PCI-Express™.

The PCI Express standard (PCI Express™ Base Specification, Revision 1.0a, Apr. 15, 2003) includes a high speed path that is designed to work only with electrical interconnects. A PCI Express transmitter detects the presence of a receiver by measuring the time constant of the data output and determining if a 50Ω load on the receiver is connected.

In the case of an optical link, an optical transceiver may be electrically connected to the PCI Express device, however the optical fiber may not be connected. The PCI Express transmitter would detect the presence of a receiver, due to the presence of the optical transceiver, but if the optical fiber was not connected, no link would actually be present.

BRIEF DESCRIPTION OF THE DRAWINGS

A better understanding of the present invention can be obtained from the following detailed description in conjunction with the following drawings, in which.

DETAILED DESCRIPTION

In the following description, for purposes of explanation, numerous details are set forth in order to provide a thorough understanding of embodiments of the present invention. However, it will be apparent to one skilled in the art that these specific details are not required in order to practice the present invention as hereinafter claimed.

Embodiments of the present invention concern using optical links with high speed electrical interconnects. Although the following discussion centers on PCI Express, it will be understood by those skilled in the art that the present invention as hereinafter claimed may be practiced in support of any type of electrical interconnect using the described method of receiver detection. Also, although at least part of the following discussion centers high speed interconnections within computer systems, it will be understood by those skilled in the art that the present invention as hereinafter claimed may be practiced in connection with other electronic devices or systems having high speed interconnections, or in connection with linking one or more computer systems or other electronic devices using a high speed interconnection.

According to the PCI Express standard, a PCI Express transmitter detects the presence of a receiver by measuring the time constant of the data output and determining if a 50Ω load on the receiver is connected. Other electrical interconnects may use a similar receiver detection method.

For proper receiver detection, a transmitter must start at a stable voltage prior to the detect common mode shift. This voltage may be VDD, GND, or some other stable common mode voltage between VDD and GND. The transmitter then changes the common mode voltage on the D+ and D− data lines to a different value. If the common mode voltage is VDD, the change must be towards GND. If the common mode voltage is GND, the change must be towards VDD. If the common mode voltage is set to a stable value between VDD and GND, the direction that the voltage moved to get to the stable initial electrical idle voltage is important and the detect common mode shift must be in the opposite direction.

A receiver is detected based on the rate that the lines change to the new voltage. The receiver is not present if the voltage at the transmitter changes at a rate dictated only by the transmitter impedance and the capacitance of the interconnect and series capacitor. The receiver is present if the voltage at the transmitter changes at a rate dictated by the transmitter impedance, the series capacitor, the interconnect capacitance, and the receiver termination.

Figure 1:
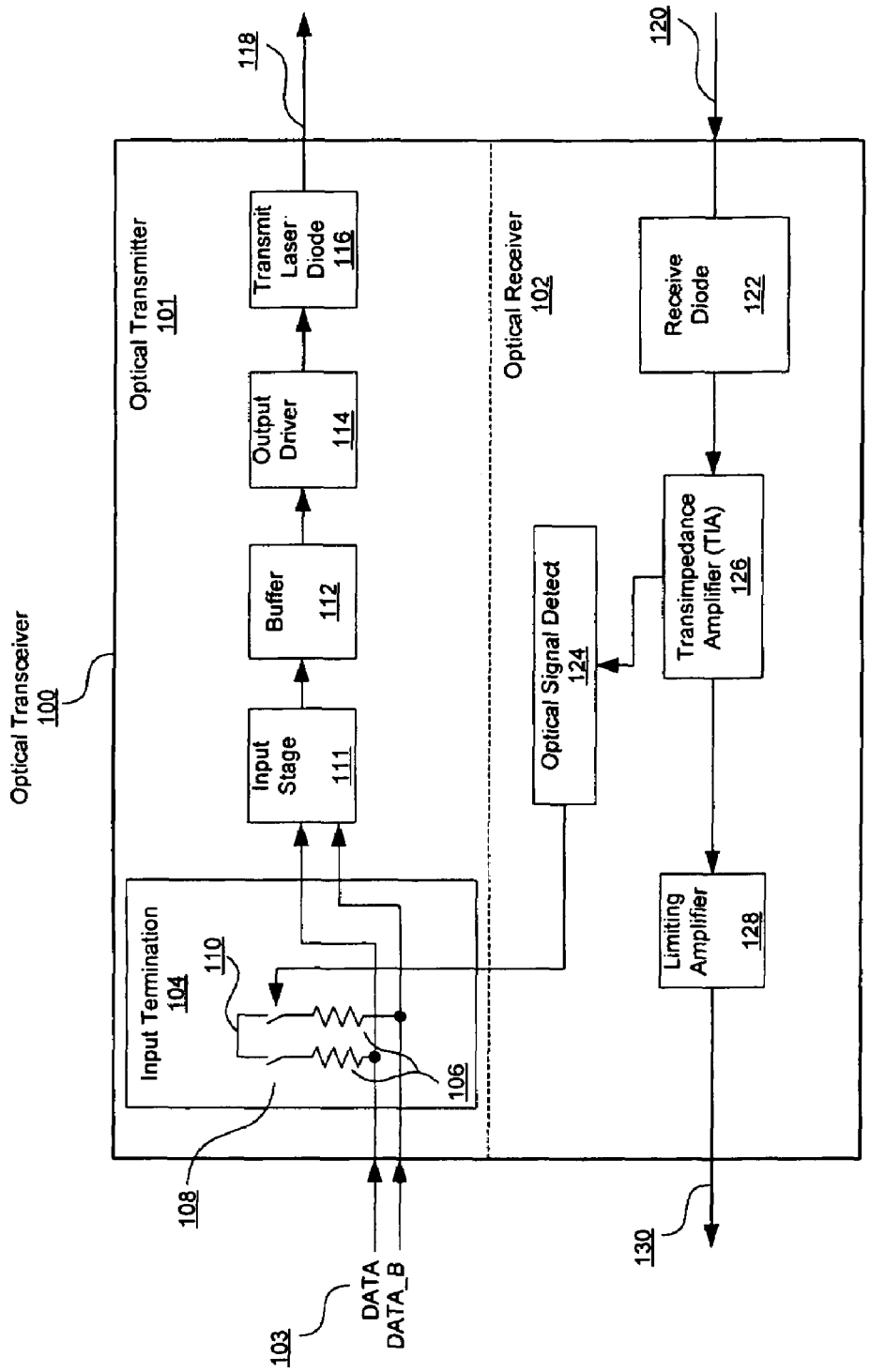
FIG. 1 is an illustration of a block diagram of an optical transceiver according to one embodiment.

FIG. 1 illustrates a block diagram of optical transceiver which may be used to implement optical interconnects for PCI Express. Optical transceiver (100) includes an optical transmitter (101) and an optical receiver (102).

One or more data signals (103), such as DATA and DATA_B, are input to the optical transmitter (101). The data signals may be received from a PCI Express device. The data signals enter an input termination stage (104). The input termination stage includes a termination device (106) for each input data signal. The termination device may comprise a resistive element, such as a resistor, a transistor operating in the linear region, or another device or combination of devices which provide the appropriate input termination. In one embodiment, each termination device is approximately equal to a 50Ω input termination.

Each termination device is coupled to a switch (108). The switch (108) may be open or closed, depending on whether an optical signal (120) is detected by the optical receiver (102). If an optical signal is detected, the switches (108) are closed, thus connecting the input termination to a node having a predetermined voltage (110). The predetermined voltage (110) may be VDD, GND or a common mode voltage between VDD and GND, per the PCI Express specification. When an optical signal is detected and the switches (108) are closed, a 50Ω termination is present on the transmitter input side.

When no optical signal is detected, the switches (108) remain open, thus no input termination is present.

After the input termination stage (104), the data signals (103) enter the input stage (111). In one embodiment, the input termination (104) may be integrated into the input stage (111). The input stage (111) may include a multiplexer and/or other signal processing elements.

The optical transmitter may also include a buffer (112) to buffer the data signals, an output driver (114) to drive the optical signals, and a transmit laser diode (116) to transmit the optical signals (118) across an optical interface.

Optical signals (120) are received by the optical receiver (102) within the optical transceiver (100). An optical signal is received by a receive photo diode (122). The signal is then sent to a transimpedance amplifier (TIA) (126), which amplifies the current from the photo diode. The signal then passes through a limiting amplifier (128) and is output as an electrical signal (130).

Optical signal detect circuitry (124) detects when an optical signal (120) is received by the optical receiver. In one embodiment, the optical signal detect circuitry (124) may be coupled to the transimpedance amplifier (126). In other embodiments, the optical signal detect circuitry (124) may be coupled directly to the optical input signal (120), to the receive diode (122), or to another circuit within the optical receiver (102).

In one embodiment, the optical signal detect circuitry directly detects an optical signal (120) being received by the optical receiver. In another embodiment, an electrical signal may be sent along with the optical signal (120) and may be used to indicate when an optical signal is being received. In this case, the optical signal detect circuitry may analyze the electrical signal input to determine if an optical signal is being received by the optical receiver.

The optical signal detect circuitry (124) is coupled to switches (108) within the input termination block (104) of the optical transmitter (101). As described above, when an optical signal is detected, the switches are closed, thus activating the input termination circuit. When no optical signal is detected, the switches remain open, and no input termination exists.

Figure 2:
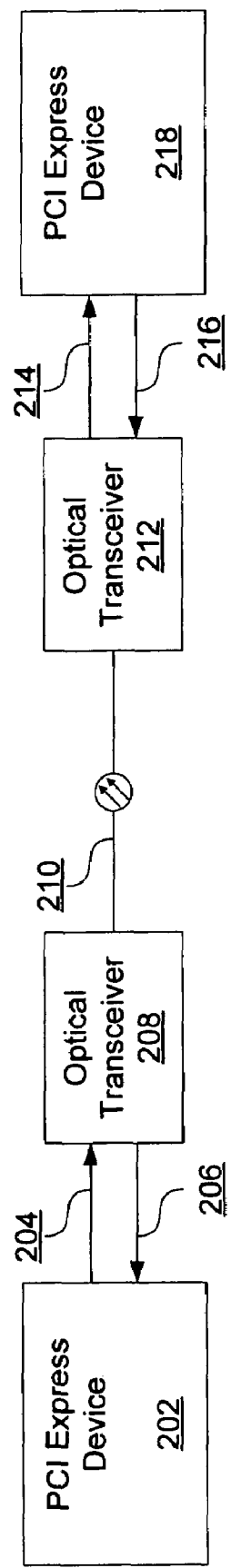
FIG. 2 is an illustration of a system block diagram according to one embodiment.

FIG. 2 illustrates a block diagram of a system which includes an optical interface (210) between two PCI Express devices (202, 218).

PCI Express devices 202 and 218 are electrically coupled to optical transceivers 208 and 212. Each PCI Express device is coupled to an optical transceiver by at least one or more transmit data signals (204, 216) and one or more receive data signals (206, 214). In one embodiment, the transmit data signals and the receive data signals are a differential signal pair, such as differential signal pairs 204 & 206 or 214 & 216.

Optical transceiver (208) includes switched input termination circuitry and optical signal detect circuitry, as described above in conjunction with FIG. 1, and is coupled via an optical link (210) to a second optical transceiver (212), which also includes switched input termination circuitry and optical signal detect circuitry. When powered on, each optical transceiver emits a signal, such as a low level dc optical signal, or another signal to indicate an optical connection.

If an optical link (210) is present between two optical transceivers, each transceiver's optical signal detect circuitry will detect the signal indicating that an optical link is present. Detection of this signal activates the input termination within the optical transmitter portion of the optical transceiver. The input termination is then detected by an electrical transmitter, such as a PCI Express transmitter within a PCI Express device (202, 218). The PCI Express transmitter uses the input termination of the optical transmitter to determine that a link has been established with another PCI Express device, and thus can transmit and receive data across the optical link.

When no optical link is present, the switches remain open, and the optical transceivers will have no input termination. When no input termination is detected by the PCI Express device, the PCI Express transmitter determines that no link, optical or electrical, has been established with another device, and thus will not attempt to transmit or receive data.

Figure 3:
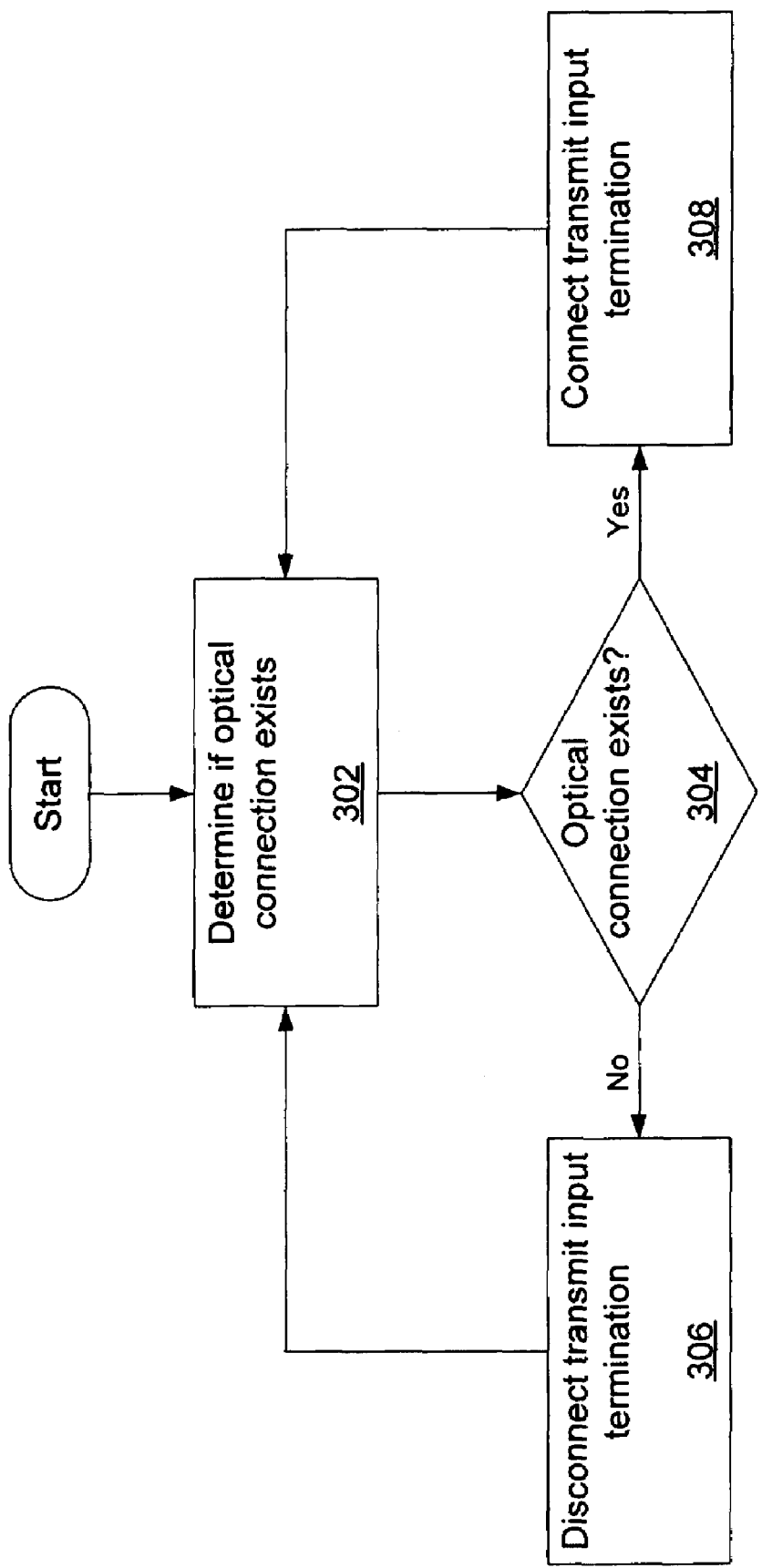
FIG. 3 is a flow diagram according to one embodiment.

FIG. 3 is a flow diagram which illustrates a method by which an optical transceiver may determine when it is appropriate to connect the transmit input termination. First, as illustrated in block 302, a determination is made whether an optical connection exists. This determination may be made by logic which detects if an optical signal is being received.

If an optical connection exists (block 304), then transmit input termination is connected (block 308). If no optical connection exists, then the transmit input termination is disconnected (block 306). While the optical transceiver is powered on, it may continuously monitor to determine whether an optical connection is present, and connect or disconnect the input termination accordingly.

Thus, a method, apparatus, and system for implementing optical interconnects between high speed electrical interconnects are disclosed. In the above description, numerous specific details are set forth. However, it is understood that embodiments may be practiced without these specific details. For example, while the PCI Express high speed interconnect is discussed herein, embodiments of the present invention may also be implemented in conjunction with other high speed interconnects which require a similar method of receiver detection. In other instances, well-known circuits, structures, and techniques have not been shown in detail in order not to obscure the understanding of this description. Embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
    a first optical transceiver coupled to a first PCI Express device and including logic to connect an input termination when an optical signal is detected in the first optical transceiver;
    a second optical transceiver coupled to the first optical transceiver; and
    a second PCI Express device coupled to the second optical transceiver.

2. The system of claim 1, wherein the first optical transceiver is electrically coupled to the first PCI Express device and the second PCI Express device is electrically coupled to the second optical transceiver.

3. The system of claim 2, wherein the second optical transceiver is optically coupled to the first optical transceiver.

4. The system of claim 1, wherein the logic is to connect the input termination between a predetermined voltage and an input electrical line coupled to the first PCI Express device when the optical signal is received.

5. The system of claim 4, wherein the logic further is to disconnect the input termination when no optical signal is received.

6. The system of claim 4, wherein the second optical transceiver includes second logic to connect a second input termination when an optical signal is received in the second optical transceiver.

7. The system of claim 6, wherein the second logic further is to disconnect the second input termination when no optical signal is received.

8. The system of claim 4, wherein the input termination comprises one or more 50 ohm resistive elements.

9. The system of claim 1, wherein the optical signal is a low level DC optical signal.

10. A method comprising:
    determining if a first optical transceiver is connected to a second optical transceiver via an optical link;

if the first optical transceiver is connected to the second optical transceiver via the optical link, connecting a transmit input termination between an electrical input signal and a node having a fixed voltage; and if the first optical transceiver is not connected to the second optical transceiver via the optical link, disconnecting the transmit input termination.

11. The method of claim 10, wherein determining if the first optical transceiver is connected to the second optical transceiver comprises determining if an optical signal is being received in the first optical transceiver.

12. The method of claim 10, wherein determining if the first optical transceiver is connected to the second optical transceiver comprises determining if a second electrical input signal is being received in the first optical transceiver.

13. The method of claim 10, wherein connecting the transmit input termination comprises closing a switch connecting one or more resistive elements to the node.

* * * * *